US007800928B1

(12) United States Patent
Dernovsek et al.

(10) Patent No.: US 7,800,928 B1
(45) Date of Patent: Sep. 21, 2010

(54) METHOD OF OPERATING A RESONANT INVERTER USING ZERO CURRENT SWITCHING AND ARBITRARY FREQUENCY PULSE WIDTH MODULATION

(75) Inventors: John Jay Dernovsek, Madison, AL (US); Steve Mays, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 252 days.

(21) Appl. No.: 11/951,969

(22) Filed: Dec. 6, 2007

(51) Int. Cl.
*H02M 7/5387* (2007.01)
*H02M 3/24* (2007.01)
(52) U.S. Cl. .......................... 363/132; 363/98
(58) Field of Classification Search .................... 363/17, 363/56.02–56.05, 97, 98, 132; 315/209 R
See application file for complete search history.

(56) References Cited

U.S. PATENT DOCUMENTS

| 4,071,812 A | 1/1978 | Walker |
| 4,277,728 A | 7/1981 | Stevens |
| 4,346,332 A | 8/1982 | Walden |
| 4,459,516 A | 7/1984 | Zelina et al. |
| 4,935,857 A * | 6/1990 | Nguyen et al. ................ 363/17 |
| 5,212,427 A | 5/1993 | Jones |
| 5,504,398 A | 4/1996 | Rothenbuhler |
| 5,982,106 A * | 11/1999 | Bobel ..................... 315/209 R |
| 6,445,140 B2 | 9/2002 | Buij et al. |
| 6,696,803 B2 | 2/2004 | Tao |
| 6,870,326 B1 | 3/2005 | Stevens |
| 7,110,269 B2 | 9/2006 | Cao et al. |
| 7,262,981 B2 * | 8/2007 | Stevanovic et al. .......... 363/132 |
| 2006/0232220 A1 * | 10/2006 | Melis ..................... 315/209 R |

* cited by examiner

*Primary Examiner*—Jessica Han
(74) *Attorney, Agent, or Firm*—Waddey & Patterson; Mark J. Patterson; Gary L. Montle

(57) ABSTRACT

A method of controlling a series-resonant, half-bridge inverter includes turning off the bottom switch and turning on the top switch the inverter when the current through the resonant inductor crosses the zero axis while the current is increasing, thereby insuring zero voltage switching of the inverter switches and increases the overall switching period so that the actual inverter frequency is closer to the resonant frequency of the series-resonant circuit. Using an on-time control circuit, the method further includes controlling the current delivered to the load (such as a gas discharge lamp) by varying the on-time of the top inverter switch.

19 Claims, 3 Drawing Sheets

METHOD OF OPERATING A RESONANT INVERTER USING ZERO CURRENT SWITCHING AND ARBITRARY FREQUENCY PULSE WIDTH MODULATION

CROSS-REFERENCES TO RELATED APPLICATIONS

None.

BACKGROUND OF THE INVENTION

The present invention relates generally to resonant inverters, such as those used in an electronic ballast to provide power to a gas discharge lamp. More particularly, the present invention pertains to methods of operating a resonant inverter-type electronic ballast to provide stable operation of, and to control power to, a gas discharge lamp.

Electronic ballasts are commonly used to power gas discharge lamps, such as a fluorescent lamp. A typical electronic ballast will include a half-bridge resonant inverter driven by an inverter drive circuit. The inverter drive circuit controls the switching of the top and bottom inverter switches so that the inverter operates at or near the self-resonant frequency of the inverter. Using a driven resonant inverter allows for the lamp power to be controlled (for dimming and/or stable power regulation) by varying the inverter frequency and/or by varying the pulse width of the inverter output.

Stable operation of the lamp is important in the design and operation of an electronic ballast. For many applications, an ideal resonant inverter would act as an ideal current source in which the open loop output impedance is infinite so that all of the current generated by the inverter flows to the lamp. Also, to achieve optimal efficiency while lowering component stresses, a preferred resonant inverter design would insure zero-voltage switching of the inverter transistors.

Unfortunately, prior art resonant inverters that operate as current sources suffer from several problems caused by deficiencies in the inverter switching methods. For example, use of frequency modulation to control the inverter output does not guarantee zero voltage switching. Moreover, with frequency modulation, the higher frequencies and higher lamp voltages associated with lamp dimming create undesirable circulating currents through the component and parasitic capacitances in the circuit. Resonant inverters that use symmetric pulse width modulation (also known as dead time modulation) also have a high likelihood of non-zero voltage switching.

What is needed, then, is a method of operating a resonant inverter that maximizes the open loop output impedance by operating the inverter close to self-resonance and that guarantees zero voltage switching of the inverter transistors.

BRIEF SUMMARY OF THE INVENTION

The method of this invention is implemented in an inverter that has top and bottom inverter switches arranged in a half-bridge configuration and a series-resonant circuit connected across the output of the inverter. The inverter is also connected to a drive circuit that controls commutation of the top and bottom inverter switches. The series-resonant circuit includes a resonant capacitor in series with a resonant inductor. A load, such as a gas discharge lamp, is connected across the resonant capacitor.

The method of the present invention includes turning off the bottom switch and turning on the top switch of a series-resonant half-bridge inverter when the current through the resonant inductor crosses the zero axis while the current is increasing. This insures zero voltage switching of the inverter switches. This operation also increases the overall switching period so that the actual inverter frequency is closer to the resonant frequency of the series-resonant circuit. By operating the inverter close to resonance, the open loop output impedance of the inverter is increased, providing a more stable operation of a load such as gas discharge lamp.

Using an on-time control circuit, the method of this invention further includes controlling the current delivered to the load (such as a gas discharge lamp) by varying the on-time of the top inverter switch. This is accomplished in one embodiment by feeding back—cycle-by-cycle—a measurement of the current through the resonant inductor so that the top switch is commutated when the resonant inductor current reaches a reference value. In a second embodiment, the on-time of the top inverter switch is controlled by commutating the top switch based on a timer that is triggered when the top switch is turned on.

In one embodiment of the invention, the inverter drive circuit includes (a) a switching circuit coupled to the top and bottom inverter switches and (b) a zero-crossing detector circuit coupled to the inverter to monitor the AC load current through the resonant inductor. The zero-crossing detector circuit compares the measured AC load current with a first reference current value. The zero-crossing detector circuit also compares a derivative of the measured AC load current with a rate of change reference value. When the measured AC load current is at or near the first reference current value, and when the rate of change of the measured AC load current is one of either above or below the rate of change reference value, zero-crossing detector circuit generates an indicator signal. Preferably, the first reference current value is zero. In addition, the rate of change reference value is preferably zero so that the indicator signal is generated when the current is positive.

The first indicator signal is delivered to an input to the switching circuit. The switching circuit is operable to commutate the top and bottom inverter switches. Using the first indicator signal, the switching circuit causes the top inverter switch to turn on, and the bottom inverter switch to turn off, when the current in the resonant inductor crosses the zero-axis, while the inductor current is increasing. This insures zero-current switching of the inverter switches and increases the overall switching period so that the inverter operates closer to resonance.

DETAILED DESCRIPTION OF THE INVENTION

Figure 1:
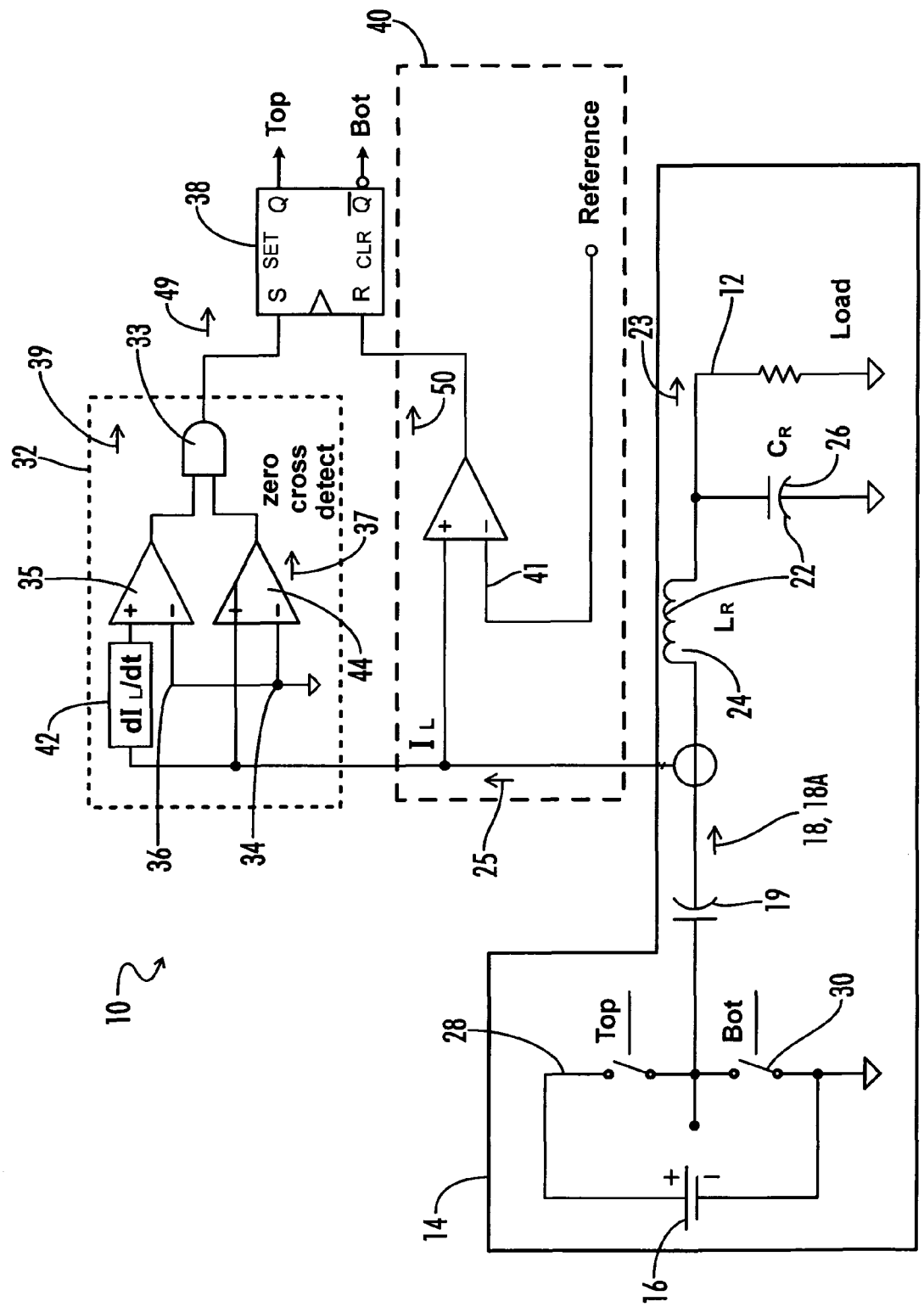
FIG. 1 is a schematic diagram of a first embodiment of the invention.

A first embodiment of the inverter circuit 10 of the present invention is shown in FIG. 1. The inverter circuit 10 is particularly useful when the load 12 is a gas discharge lamp. The preferred embodiment stabilizes the operation of the lamp by maximizing the open loop output impedance of the inverter circuit.

The inverter circuit 10 includes a half-bridge inverter 14 coupled to a DC source 16 and a series-resonant circuit 22. The inverter 14 and series resonant circuit 22 conventionally operate to convert a DC voltage from DC source 16 to a high frequency, high voltage AC current that is supplied to a load 12, such as a gas discharge lamp. In this embodiment, the inverter 14 is a driven inverter in which commutation of the top and bottom inverter switches 28, 20 is controlled by an inverter drive circuit.

A DC blocking capacitor 19 may be placed between the inverter 14 and the resonant circuit 22. The inverter output 18 may have varying time, frequency, and envelope characteristics depending on the characteristics of resonant circuit 22 and the desired application.

In a preferred embodiment, the inverter 14 has a top switch 28 and bottom switch 30 arranged in a half-bridge inverter topology. Preferably, the series-resonant circuit 22 includes a resonant inductor 24 and resonant capacitor 26. The load 12 is connected across the resonant capacitor 26 to receive an AC load current 23. (Labeled $I_{LOAD}$ on FIG. 3(a).)

The inverter drive circuit includes a zero-crossing detector circuit 32 coupled to the resonant circuit 22. The zero-crossing detector circuit 32 monitors the current $I_{LSer}$ through the resonant inductor 24 so that commutation of the inverter switches 28, 30 occurs (a) at a frequency that is close to the resonant frequency of the resonant circuit 22 and (b) in a manner that is synchronized to a particular rate of change of the current through resonant inductor 24. By selecting certain current and current rate of change reference values, the zero-crossing detector circuit 32 can assure zero voltage switching of the top and bottom inverter transistors 28, 30.

The zero-crossing detector circuit 32 receives an AC current signal 25 corresponding to the current $I_{LSer}$ through resonant inductor 24. The AC current signal 25 may also be any current signal associated with the AC load current 23 so long as the AC current signal 25 has a frequency and amplitude approximately proportionally related to the frequency and amplitude of the AC load current 23. Preferably however, the AC current signal 25 corresponds to the same frequency as the AC load current 23. Those of skill in the art will recognize that the AC current signal 25 can be generated in a variety of conventional ways, such as by inductively coupling to the resonant inductor or by measuring a voltage across a current sensing resistor (not shown).

Figure 2:
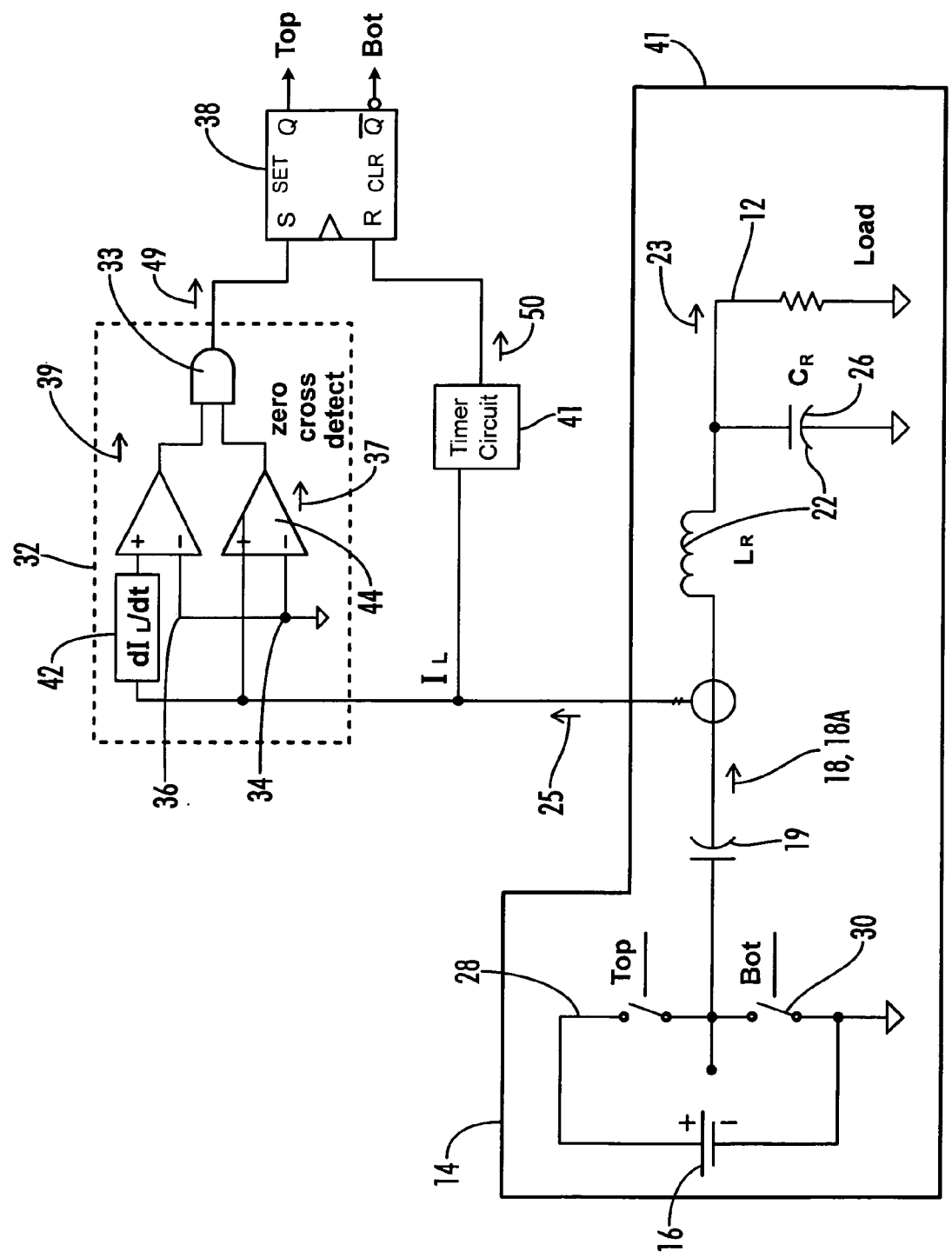
FIG. 2 is a schematic diagram of a second embodiment of the invention.

The zero-crossing detector circuit 32 is operable to compare the AC current signal 25 with a first reference current value 34. As shown in FIGS. 1-2, this may be accomplished using a first comparator 35. The first comparator 35 produces a current value crossing signal 37 when the AC current signal 25 is at or near the first reference current value 34.

The zero-crossing detector circuit 32 is also operable to compare a rate of change of the AC current signal 25 with a rate of change reference value 36. This may be accomplished by utilizing a current derivative (rate of change) detector 42 and a second comparator 44. The current derivative detector 42 generates a signal that corresponds to a rate of change of the AC current signal 25. The current derivative detector 42 may be a combination of passive components or an active device. For example, the current derivative detector 42 may include an inductor that is coupled to other passive or active components. Alternatively, the current derivative detector 42 may be a processor device that calculates the derivative of the AC current signal 25 and outputs the appropriate rate of change current signal. This signal is then coupled to one input of second comparator 44.

The second comparator 44 compares the rate of change of the AC current signal 25 with a rate of change reference value 36. When the rate of change of the AC current signal 25 is one of either approximately above or below the rate of change reference value 36, the zero-crossing detector circuit 32 generates a rate of change crossing signal 39. A logic device 33 is coupled to the outputs of comparators 35, 44. The logic device 33 is functional to generate a first indicator signal 49 when the current value crossing signal 37 and the rate of change crossing signal 39 are generated by the first and second comparators 35, 44. Preferably, the logic device 33 is an AND gate.

The zero-crossing detector circuit 32 provides all of the measurements required for zero voltage switching. Zero voltage switching occurs when the inverter switches 28, 30 are commutated near or at a zero current crossing and when the current rate of change is approximately positive. Consequently, the first reference current value 34 and the rate of change reference value 36 are at or near zero. In addition, the first indicator signal 49 is produced when the rate of change of the AC current signal 25 is approximately above the rate of change reference value 36. In this manner, the indicator signal 49 is produced when the AC load current 23 is at or near a zero crossing and has a positive rate of change.

The AC current signal 25 does not need to have the same frequency as the AC load current 23. The AC current signal 25 needs to have a frequency approximately proportional to that of the AC load current 23. Thus, additional devices (not shown) may be included in the inverter circuit 10 so that the indicator signal 49 is produced according to a known proportion between the frequencies of the AC load current 23 and the AC current signal 25. For example, the circuit may cause the indicator signal 49 to be produced at every other zero crossing if the frequency of the AC current signal 25 is approximately double the frequency of the AC load current 23. However, in the preferred embodiment the AC current signal 25 has the same frequency as the AC load current 23.

Referring again to FIGS. 1-2, the inverter drive circuit includes a switching circuit 38 coupled to the inverter 14 and to the zero crossing detector circuit 32. The switching circuit 38 is responsive to the first indicator signal 49 from the output from the zero crossing detector circuit 32 to commutate the top and bottom inverter switches 28, 30. As described above, the first indicator signal 49 is preferably generated at a zero crossing of the AC current signal 25 and when the rate of change of the AC current signal 25 is positive.

As shown in FIGS. 1-2, the switching circuit 38 is coupled to the top and bottom inverter switches 28, 30 such that when one switch 28, 30 is open the other switch 30, 28 is closed. Therefore, the switching circuit 38 may be a conventional S-R flip-flop device in which the set input S receives the first indicator signal 49.

The power delivered to the load 12 can be controlled by varying the on-time of the top inverter switch 28, using an on-time control circuit. In the embodiment of FIG. 1, the on-time of top inverter switch 28 is controlled by a comparator circuit 40 coupled to the resonant circuit 22. The comparator circuit 40 has a signal input coupled to the resonant inductor 24 and a reference input connected to a second reference current value 41. The comparator circuit 40 compares the AC current signal 25 with second reference current value 41. When the AC current signal 25 is at or near the second reference current value 41, a second indicator signal 50 is sent to the reset input R of switching circuit 38. The switching circuit 38 responds to the second indicator signal 50 to cause commutation of the inverter switches 28, 30. More particularly, the output Q of switching circuit 38 is coupled to the top inverter switch 28. The complementary output Q' is coupled to the bottom switch 30. In one embodiment, the top and bottom switches 28, 30 can be switching transistors in which the bases (or gates) of the transistors are coupled to the flip-flop outputs Q and Q'. When the set input S receives the first indicator signal 49, the normal output Q is switched high while the complementary output Q' is switched low. This signal is represent as $S_{TOP}$ on FIG. 3A. This turns on the top inverter switch 28 and turns off the bottom inverter switch 30. When the second indicator signal 50 is received by the reset input R, the normal output Q is switched low while the complementary output Q' is switched high. This causes the top inverter switch 28 to turn off and the bottom inverter switch 30 to turn on.

In a second embodiment of the inverter circuit 10 shown in FIG. 2, the on-time of the top inverter switch 28 is controlled by a timer circuit 41. The timer circuit 41 is preferably activated when the top inverter switch 28 is turned on. Thereafter, the second indicator signal 50 is generated after a time delay, causing the top inverter switch 28 to turn off. Preferably, and as shown in FIG. 3B, the time delay is synchronized so that the top inverter switch 28 is turned off at or near a peak current value for the AC current signal 25. As described above, the zero-crossing detector circuit 32 insures commutation at or near zero current crossing when the load current is increasing.

Figure 3A:
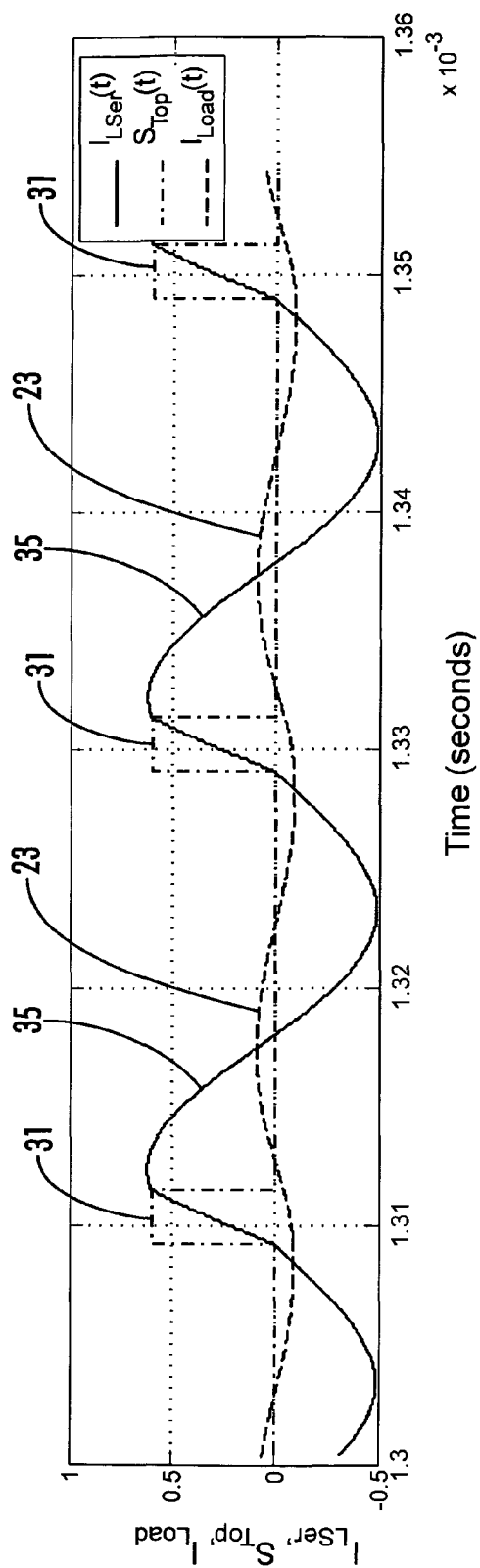
FIG. 3A is a graph showing the timing and magnitude relationships among the AC load current ($I_{LOAD}$), the resonant inductor current ($I_{LSer}$), and commutation of the top inverter switch ($S_{TOP}$) in accordance with one aspect of the invention.
Figure 3B:
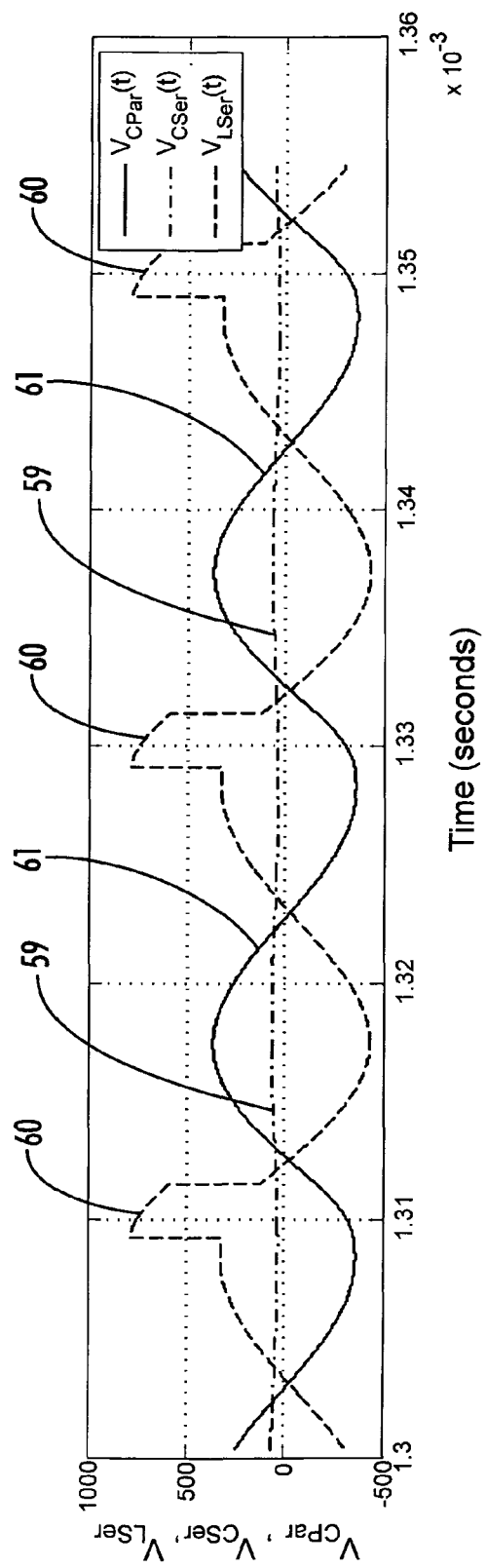
FIG. 3B is a graph showing the timing and magnitude relationships among the voltage across the DC blocking capacitor ($V_{CSer}$), the voltage across the resonant inductor ($V_{LSer}$), and the voltage across the resonant capacitor ($V_{CPar}$).

A graphical illustration of the operation of the inverter circuit 20 is shown in FIGS. 3A-3B. Referring specifically to FIG. 3A, the graph depicts the output 31 from the normal output Q of switching circuit 38. When the output 31 is low, top inverter switch 28 is turned off. When the zero crossing detector circuit 32 determines that the rate of change of the AC current signal 25 is positive, and that the AC current signal 25 is at or near zero, the first indicator signal 49 is generated at set input S and the output 31 is switched high. This turns top switch 28 on. When the second indicator signal 50 is received by the reset input R, the top inverter switch 28 is turned off. As shown in FIG. 3A, the output 31 is switched back to low at or near the peak value of the AC current signal 25. The resultant AC load current 23 is illustrated in the graph.

FIG. 3B shows a graphical illustration of the resultant voltage outputs from the inverter circuit 10, including the voltage 59 across DC blocking capacitor 19. The voltage 60 across the resonant inductor 24 is also shown. The voltage 61 across resonant capacitor 26, which is the same as the AC voltage across the load 12, is also shown.

Throughout this disclosure, the words "approximately" and "near" have been to describe when a various actions of the inverter circuit 10 are triggered or performed. These words recognize that no electronic device can perform a particular action precisely at a particular moment. While electronic devices are intended to be as accurate as possible, one of ordinary skill in the art recognizes that in practice no device performs at 100% accuracy. The words "approximately" and "near" are intended to recognize this inaccuracy in all electronic devices. Standard errors in electronic circuits and techniques utilized for correcting these errors should be considered when interpreting whether a particular action of the inverter circuit 10 is performed "approximately" and "near" a reference value.

Thus, although there have been described particular embodiments of the present invention of a new and useful Method of Operating a Resonant Inverter Using Zero Current Switching and Arbitrary Frequency Pulse Width Modulation, it is not intended that such references be construed as limitations upon the scope of this invention except as set forth in the following claims.

What is claimed is:

1. An inverter circuit comprising:
   an inverter including inverter switches coupled to a resonant circuit for providing an AC load current to a load;
   an inverter drive circuit coupled to the inverter to provide for commutation of the inverter switches;
   the inverter drive circuit comprising a zero crossing detector circuit coupled to the resonant circuit to receive an AC current signal, wherein the zero crossing detector circuit is operable
      to compare the AC current signal with a first reference current value,
      to compare a rate of change of the AC current signal with a rate of change reference value, and
      to generate a first indicator signal when the AC current signal is at or near the first reference current value and when the rate of change of the AC current signal is at or near the rate of change reference value; and
   the inverter drive circuit further comprises a switching circuit coupled to the inverter switches and to the zero crossing detector circuit, the switching circuit being responsive to the first indicator signal to provide for zero current commutation of the inverter switches while the AC current signal is increasing.

2. The inverter circuit of claim 1, further comprising
   a comparator circuit coupled to the resonant circuit, the comparator circuit operable to compare the AC current signal with a second reference current value, the comparator generating a second indicator signal when the AC current signal is at or near the second reference current value; and
   the switching circuit is coupled to the comparator circuit and is responsive to the second indicator signal to control an on-time of at least one inverter switch.

3. The inverter circuit of either of claim 1 or claim 2, wherein:
   the first reference current value is approximately zero;
   the rate of change reference value is at or near zero; and
   the first indicator signal is generated when the rate of change of the AC current signal is above the rate of change reference value.

4. The inverter circuit of claim 2, wherein the second reference value is at or near a peak current value for the AC current signal.

5. The inverter circuit of claim 1, further comprising:
   a timer circuit coupled to the resonant circuit, the timer circuit generating a second indicator signal after a delay time; and
   the switching circuit is coupled to the timer circuit and is responsive to the second indicator signal to control an on-time of at least one inverter switch.

6. The inverter circuit of claim 5, wherein the time delay is synchronized so that the at least one inverter switch turns off at or near a peak current value for the AC current signal.

7. The inverter circuit of claim 1 wherein the switching circuit is a flip-flop device.

8. The inverter circuit of claim 1, wherein the zero crossing detector circuit comprises a current derivative circuit that is responsive to a rate of change of the AC current signal.

9. The inverter circuit of claim 1, wherein the zero crossing detector circuit further comprises a first comparator comparing the rate of change of the AC current signal and the rate of change reference value, the first comparator generating a rate of change crossing signal when the rate of change of the AC current is signal is approximately above the rate of change reference value.

10. The inverter circuit of claim 9 wherein the rate of change reference value is approximately zero so that the rate of change of the AC current signal is approximately positive when the zero crossing signal is transmitted.

11. The inverter circuit of the claim 10, the zero crossing detector circuit further comprising:
   a second comparator comparing the AC current signal and the first reference current value and generating a current value crossing signal when the AC current signal is at or near the first reference current value; and
   a logic device coupled to the first and second comparators, the logic device being functional to generate the first indicator signal when the current value crossing signal and the rate of change crossing signal are generated by the first and second comparators.

12. The inverter circuit of claim 1, wherein the resonant circuit comprises an inductor in series with a capacitor and the AC current signal corresponds to an AC current through the resonant inductor.

13. The inverter circuit of claim 12, wherein the inverter is a half-bridge inverter having a top inverter switch and a bottom inverter switch.

14. An electronic ballast for providing power to a gas discharge lamp comprising:
   (a) a half-bridge inverter, the inverter including top and bottom inverter switches coupled to a resonant inductor connected in series with a resonant capacitor;
   (b) an inverter drive circuit comprising a zero crossing detector circuit and a switching circuit, the switching circuit having first and second control inputs;
   (c) the zero crossing detector circuit coupled to the resonant inductor and having an output coupled to the first control input on the switching circuit;
   (d) an on-time control circuit having an output coupled to provide a second indicator signal at the second control input on the switching circuit;
   (e) the switching circuit having top and bottom control outputs coupled respectively to the top and bottom inverter switches;
   (f) the zero crossing detector circuit being responsive to an AC current through the inductor to generate a first indicator signal at the first control input on the switching circuit when the inductor current crosses a zero current axis while the inductor current is increasing;
   (g) the switching circuit being responsive to the first indicator signal to cause the first inverter switch to turn on and the second inverter switch to turn off when the inductor current crosses the zero current axis while the inductor current is increasing; and
   (h) the switching circuit being responsive to the second indicator signal to control the on-time of the top inverter switch.

15. The inverter circuit of claim 14 wherein the on-time control circuit comprises a comparator circuit having a reference input, a signal input coupled to the resonant inductor, and an output coupled to the second control input on the switching circuit, the comparator circuit being responsive to the AC current through the inductor to generate the second indicator signal at the second control input on the switching circuit when the inductor current exceeds a reference level applied at the reference input.

16. The inverter circuit of claim 14 wherein the on-time control circuit comprises a timer circuit, the timer circuit coupled to the resonant inductor so that the timer circuit generates the second indicator signal when the first inverter switch is turned on and terminates the second indicator signal after a time delay.

17. The inverter circuit of either claim 15 or claim 16 wherein the switching circuit is a flip flop device.

18. A method of operating a series-resonant, half-bridge inverter to maximize the open loop output impedance of the inverter and to control power delivered to a load, the inverter including top and bottom inverter switches and a series inductor, the method comprising:
   monitoring a current through the resonant inductor to determine when the inductor current crosses a zero current axis when the inductor current is increasing;
   turning on the top inverter switch and turning off the bottom inverter switch when the inductor current crosses the zero current axis when the inductor current is increasing; and
   controlling an on-time of the top inverter switch by comparing the measured current through the resonant inductor to a reference level and turning off the top inverter switch and turning on the bottom inverter switch when the measured resonant inductor current exceeds the reference level.

19. A method of operating a series-resonant, half-bridge inverter to maximize the open loop output impedance of the inverter and to control power delivered to a load, the inverter including top and bottom inverter switches and a series inductor, the method comprising:
   monitoring a current through the resonant inductor to determine when the inductor current crosses a zero current axis when the inductor current is increasing;
   turning on the top inverter switch and turning off the bottom inverter switch when the inductor current crosses the zero current axis when the inductor current is increasing; and
   controlling an on-time of the top inverter switch by activating a timer circuit when the top inverter switch is turned on and deactivating the timer circuit after a time delay to cause the top inverter switch to turn off and the bottom inverter switch to turn on.

* * * * *